(12) United States Patent  
Kobayashi et al.

(10) Patent No.: US 8,623,552 B2  
(45) Date of Patent: Jan. 7, 2014

(54) NEGATIVE ACTIVE MATERIAL FOR LITHIUM SECONDARY BATTERY, AND LITHIUM SECONDARY BATTERY INCLUDING SAME

(75) Inventors: Naoya Kobayashi, Minoh (JP); Sung-Soo Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 284 days.

(21) Appl. No.: 12/135,078

(22) Filed: Jun. 6, 2008

(65) Prior Publication Data

US 2008/0305397 A1    Dec. 11, 2008

(30) Foreign Application Priority Data

Jun. 7, 2007    (JP) .................................. 2007-151715

(51) Int. Cl.
*H01M 10/0525*    (2010.01)
*H01M 4/131*    (2010.01)

(52) U.S. Cl.
USPC .................................. 429/231.5; 429/231.95

(58) Field of Classification Search
USPC .................................................. 429/209–232
See application file for complete search history.

(56) References Cited

U.S. PATENT DOCUMENTS

| | | |
|---|---|---|
| 5,284,721 A | 2/1994 | Beard |
| 5,378,560 A | 1/1995 | Tomiyama |
| 5,478,671 A | 12/1995 | Idota |
| 5,506,075 A | 4/1996 | Iwasaki et al. |
| 5,700,598 A | 12/1997 | Denis et al. |
| 5,705,291 A | 1/1998 | Amatucci et al. |
| 5,795,679 A | 8/1998 | Kawakami et al. |
| 6,071,489 A | 6/2000 | Sun et al. |
| 6,210,834 B1 | 4/2001 | Kweon et al. |
| 6,218,050 B1 | 4/2001 | Yoon et al. |
| 6,221,531 B1 | 4/2001 | Vaughey et al. |
| 6,316,143 B1 * | 11/2001 | Foster et al. ............... 429/218.1 |
| 6,322,928 B1 | 11/2001 | Thackeray et al. |
| 6,413,669 B1 | 7/2002 | Takeuchi et al. |
| 6,482,537 B1 | 11/2002 | Strangman et al. |

(Continued)

FOREIGN PATENT DOCUMENTS

| | | |
|---|---|---|
| CN | 1298556 A | 6/2001 |
| CN | 1304187 A | 7/2001 |

(Continued)

OTHER PUBLICATIONS

Patent Abstracts of Japan, Publication 2002-216753, Published Aug. 2, 2002, for Yamamoto, et al.
Patent Abstracts of Japan, Publication 2003-068305, Published Mar. 7, 2003, for Yamamoto, et al.
U.S. Office action dated May 13, 2009, for related U.S. Appl. No. 11/947,708.

(Continued)

*Primary Examiner* — Jonathan Crepeau
*Assistant Examiner* — Jacob Buchanan
(74) *Attorney, Agent, or Firm* — Christie, Parker & Hale, LLP (57) ABSTRACT

The present invention relates to negative electrode materials for rechargeable lithium batteries and to rechargeable lithium batteries including the same. The negative electrode materials improve the capacity characteristics and cycle-life characteristics of the rechargeable lithium batteries. The negative electrode material includes a negative active material capable of intercalating and deintercalating lithium ions, and the negative active material includes an oxide particle represented by $Li_xM_yV_zO_{2+d}$ and having a full width at half maximum of a X-ray diffraction angle ($2\theta$) at a (003) plane of 0.2 degrees or more as measured by X-ray diffraction analysis using a $CuK\alpha$ ray.

10 Claims, 3 Drawing Sheets

(56) References Cited

U.S. PATENT DOCUMENTS

| | | | |
|---|---|---|---|
| 6,517,974 B1 | 2/2003 | Kobayashi et al. | |
| 6,589,696 B2 | 7/2003 | Matsubara et al. | |
| 6,596,437 B2 | 7/2003 | Yoon et al. | |
| 6,767,669 B2 | 7/2004 | Matsubara et al. | |
| 6,783,890 B2 | 8/2004 | Kweon et al. | |
| 6,911,282 B2 | 6/2005 | Kasamatsu et al. | |
| 6,986,968 B2 | 1/2006 | Hong et al. | |
| 7,083,878 B2 | 8/2006 | Kotato et al. | |
| 7,285,358 B2 | 10/2007 | Park et al. | |
| 7,682,746 B2 | 3/2010 | Koshina | |
| 2001/0019774 A1 | 9/2001 | Suzuki et al. | |
| 2001/0028874 A1 | 10/2001 | Cho et al. | |
| 2001/0046628 A1 | 11/2001 | Oesten et al. | |
| 2001/0055711 A1 | 12/2001 | Ito et al. | |
| 2003/0003362 A1 | 1/2003 | Leising et al. | |
| 2003/0031919 A1 | 2/2003 | Isozaki et al. | |
| 2003/0049541 A1 | 3/2003 | Inagaki et al. | |
| 2003/0124431 A1 | 7/2003 | Hwang et al. | |
| 2003/0130114 A1 | 7/2003 | Hampden-Smith et al. | |
| 2003/0207178 A1 | 11/2003 | Hu et al. | |
| 2003/0211396 A1 | 11/2003 | Kobayashi et al. | |
| 2003/0215700 A1 | 11/2003 | Hosoda et al. | |
| 2004/0005265 A1 | 1/2004 | Chiang et al. | |
| 2004/0018431 A1 | 1/2004 | Gozdz et al. | |
| 2004/0029010 A1 | 2/2004 | Sada et al. | |
| 2004/0072073 A1 | 4/2004 | Okochi et al. | |
| 2004/0106040 A1 | 6/2004 | Fukuoka et al. | |
| 2004/0157133 A1 | 8/2004 | Kim et al. | |
| 2005/0042515 A1 | 2/2005 | Hwang et al. | |
| 2005/0079417 A1* | 4/2005 | Kim et al. | 429/231.2 |
| 2005/0164090 A1* | 7/2005 | Kim et al. | 429/232 |
| 2005/0175897 A1 | 8/2005 | Jung et al. | |
| 2005/0191550 A1 | 9/2005 | Satoh et al. | |
| 2006/0088766 A1* | 4/2006 | Kim et al. | 429/231.2 |
| 2006/0166098 A1 | 7/2006 | Tabuchi et al. | |
| 2006/0204850 A1 | 9/2006 | Ham et al. | |
| 2006/0236528 A1 | 10/2006 | Xu et al. | |
| 2007/0099085 A1 | 5/2007 | Choi et al. | |
| 2007/0166615 A1* | 7/2007 | Takamuku et al. | 429/231.2 |
| 2007/0207384 A1 | 9/2007 | Nakura | |
| 2008/0118834 A1* | 5/2008 | Yew et al. | 429/217 |
| 2008/0118840 A1* | 5/2008 | Yew et al. | 429/231.5 |
| 2008/0118841 A1* | 5/2008 | Kim et al. | 429/231.95 |
| 2008/0145758 A1 | 6/2008 | Kim et al. | |
| 2008/0182171 A1 | 7/2008 | Maeda et al. | |
| 2008/0182172 A1 | 7/2008 | Takamuku et al. | |
| 2008/0241688 A1 | 10/2008 | Tokita et al. | |
| 2008/0254365 A1 | 10/2008 | Kim et al. | |
| 2009/0023070 A1 | 1/2009 | Tokita et al. | |
| 2009/0068562 A1 | 3/2009 | Yew et al. | |
| 2009/0068566 A1 | 3/2009 | Park et al. | |
| 2010/0143800 A1 | 6/2010 | Sawada et al. | |

FOREIGN PATENT DOCUMENTS

| | | |
|---|---|---|
| CN | 1339834 A | 3/2002 |
| CN | 1416600 A | 5/2003 |
| CN | 1417876 A | 5/2003 |
| CN | 1607687 A | 4/2005 |
| CN | 1624960 A | 6/2005 |
| CN | 1783551 | 6/2006 |
| CN | 1841816 A | 10/2006 |
| CN | 1992420 A | 7/2007 |
| EP | 1 511 101 A2 | 3/2005 |
| EP | 1 708 296 A1 | 10/2006 |
| EP | 1 801 908 | 6/2007 |
| JP | 59-020971 | 2/1984 |
| JP | 06-060867 | 3/1994 |
| JP | 06-275265 | 9/1994 |
| JP | 06-302320 | 10/1994 |
| JP | 06-325791 | 11/1994 |
| JP | 07-014580 | 1/1995 |
| JP | 07-029600 | 1/1995 |
| JP | 07-029608 | 1/1995 |
| JP | 07-122298 | 5/1995 |
| JP | 08-124568 | 5/1996 |
| JP | 08-241707 | 9/1996 |
| JP | 10-188977 | 7/1998 |
| JP | 10-247497 | 9/1998 |
| JP | 10-270018 | 10/1998 |
| JP | 10-340723 | 12/1998 |
| JP | 11-185753 | 7/1999 |
| JP | 11-283627 | 10/1999 |
| JP | 11-329435 | 11/1999 |
| JP | 11-354104 | 12/1999 |
| JP | 2000-058059 | 2/2000 |
| JP | 2000-090916 | 3/2000 |
| JP | 2000-299132 | 10/2000 |
| JP | 2001-006683 | 1/2001 |
| JP | 2001-015101 | 1/2001 |
| JP | 2001-216962 | 8/2001 |
| JP | 2001-297796 | 10/2001 |
| JP | 2001-325950 | 11/2001 |
| JP | 2002-008652 | 1/2002 |
| JP | 2002-216753 | 8/2002 |
| JP | 2002-324551 | 11/2002 |
| JP | 2002-326818 | 11/2002 |
| JP | 2002-343431 | 11/2002 |
| JP | 2002-352801 | 12/2002 |
| JP | 2002-362923 | 12/2002 |
| JP | 2003-017053 | 1/2003 |
| JP | 2003-68305 | 3/2003 |
| JP | 2003-123757 | 4/2003 |
| JP | 2003-142096 | 5/2003 |
| JP | 2003-208891 | 7/2003 |
| JP | 2004-139947 | 5/2004 |
| JP | 2004-149391 | 5/2004 |
| JP | 2004-327190 | 11/2004 |
| JP | 2005-072008 | 3/2005 |
| JP | 2005-135872 | 5/2005 |
| JP | 2005-158604 | 6/2005 |
| JP | 2005-216855 | 8/2005 |
| JP | 2006-066085 | 3/2006 |
| JP | 2006-128115 | 5/2006 |
| JP | 2006-286599 | 10/2006 |
| JP | 2007-173096 | 7/2007 |
| KR | 2000-0060301 | 10/2000 |
| KR | 2001-0090522 | 10/2001 |
| KR | 10-0331370 | 8/2002 |
| KR | 2003-0021112 | 3/2003 |
| KR | 10-2003-0032220 | 4/2003 |
| KR | 2004-0082803 | 9/2004 |
| KR | 10-2005-0020185 | 3/2005 |
| KR | 10-2005-0052268 | 6/2005 |
| KR | 10-0497251 | 6/2005 |
| KR | 10-2005-0077079 | 8/2005 |
| KR | 2006-0028327 | 3/2006 |
| KR | 10-0570648 | 4/2006 |
| KR | 10-0570649 | 4/2006 |
| KR | 10-2006-0041828 | 5/2006 |
| KR | 10-2006-0050745 | 5/2006 |
| KR | 2006-0095221 | 8/2006 |
| KR | 2007-0016431 | 2/2007 |
| KR | 10-2007-0091028 | 9/2007 |
| KR | 10-0759410 B1 | 9/2007 |
| KR | 2007-0091938 | 9/2007 |
| KR | 10-2009-0025869 | 3/2009 |
| WO | WO 95/02001 A1 | 1/1995 |
| WO | WO 97/28569 | 8/1997 |
| WO | WO 02/061864 A1 | 8/2002 |
| WO | WO 03/038931 A1 | 5/2003 |
| WO | WO 03/096449 A1 | 11/2003 |
| WO | WO 2006/115681 A2 | 11/2006 |

OTHER PUBLICATIONS

U.S. Office action dated Jul. 2, 2009, for related U.S. Appl. No. 11/937,462.

European Search Report dated Nov. 13, 2006, for European application 04090319.7.

European Search Report dated Feb. 18, 2008, for European application 07120913.4.

European Search Report dated Jun. 2, 2008, for European application 08100042.4.

(56) References Cited

OTHER PUBLICATIONS

European Search Report dated Jun. 2, 2008, for European application 07116182.2.
Kim, S., *Synthesis and characterization of Mn $V_2O_6$ as a high capacity anode material for a lithium secondary battery*, Solid State Ionics vol. 139 (2001), pp. 57-65.
Andrukaitis, *Study of $Me_x(VO_3)_2$ vanadates, (Me=Co, Ni, Mn, 1 <x<2) for lithium rechargeable cells*, Journal of Power Sources 81-82 (1999) pp. 651-655.
Yamamoto, et al., *Anode Properties of Li1 +xV1-xO2 for Lithium Secondary Batteries*, JASRI/Spring 8, pp. 332-333.
Van Landschoot, N., *Citric acid-assisted synthesis and characterization of doped $LiCoVO_4$*, Solid State Ionics, vol. 166, (2004), Science Direct, pp. 307-316.
Sivashanmugam, A., *Glycine-Assisted Sol-Gel Combustion Synthesis and Characterization of Aluminum-Doped $LiNiVO_4$ for Use in Lithium-Ion Batteries*, Journal of Electrochemical Society, vol. 153, No. 3, (2006), pp. A497-A503, XP-002475390.
Huang, F., et al., *A novel $Li_2Ag_{0.5}V_2O_5$ Composite Film Cathode for All-Solid-State Lithium Batteries*, Electrochemistry Communications, vol. 5, (2003), pp. 262-266.
Ohzuku et al., *Zero-Strain Insertion Material of $Li[Li_{1/3}Ti_{5/3}]O_4$ for Rechargeable Lithium Cells*, Journal of the Electrochemical Society, vol. 142, No. 5, May 1995, pp. 1431-1435, XP-002401881.
Mi, et al., *Carbon-coated $Li_{1.2}Cr_{0.4}Ti_{0.4}O_2$ Cathode Material for Lithium-Ion Batteries*, Electrochemical and Solid-State Letters, vol. 9, No. 7, (2006), pp. A324-A327, XP-002467438.
U.S. Office action dated Mar. 24, 2008, for cross reference U.S. Appl. No. 11/834,335.
Japanese Office action dated Sep. 7, 2010 for Japanese Patent application 2007-153122.
Japanese Office action dated Aug. 31, 2010 for Japanese Patent application 2007-175311.
Patent Abstracts of Japan and English machine translation for Japanese Publication 06-325791.
Patent Abstracts of Japan and English machine translation for Japanese Publication 2002-326818.
Patent Abstracts of Japan and English machine translation for Japanese Publication 2002-362923.
Patent Abstracts of Japan and English machine translation for Japanese Publication 2004-149391.
U.S. Office action dated May 12, 2010, for cross-reference U.S. Appl. No. 11/590,980.
SIPO Office action dated Sep. 21, 2010 for Chinese Patent application 200710169308.9, with English translation, 11 pages.
SIPO Office action dated Dec. 29, 2010 for Chinese Patent application 200810149608.5, with English translation, 18 pages.
SIPO Office action dated Aug. 14, 2009 for Chinese Patent application 200710169308.9, 6 pages.
SIPO Office Action dated Oct. 18, 2010 for Chinese Patent application 200710169731.9, with English translation, 12 pages.
SIPO Office action dated Oct. 13, 2010 for Chinese Patent application 200710169303.6, with English translation, 13 pages.
SIPO Office Action dated May 25, 2010 for Chinese Patent application 200710169731.9, 5 pages.
SIPO Office Action dated Aug. 21, 2009 for. Chinese Patent application 200710169731.9, with English translation, 6 pages.
KIPO Office action dated Aug. 29, 2009 for Korean Patent application 10-2007-0091028, 4 pages.
KIPO Office action dated May 31, 2010 for Korean Patent application 10-2008-0063918, 5 pages.
European Search Report dated Jun. 12, 2008 for European Patent application 07121189.0, 9 pages.
European Search Report dated Feb. 27, 2008 for European Patent application 07121149.4, 13 pages.
Japanese Office action dated Mar. 29, 2011 for Japanese Patent application 2007-303286, 4 pages.
Patent Abstracts of Japan, and English machine translation of Japanese Publication 07-014580, listed above, 21 pages.
Patent Abstracts of Japan and English machine translation for Japanese Publication 2001-006683, listed above, 13 pages.
Patent Abstracts of Japan and English machine translation for Japanese Publication 2002-324551, listed above, 6 pages.
Patent Abstracts of Japan and English machine translation for Japanese Publication 2002-352801, listed above, 13 pages.
Patent Abstracts of Japan and English machine translation for Japanese Publication 2003-208891, listed above, 8 pages.
Occlude.Dictionary.com, Random House, Inc., Accessed Jul. 15, 2010, 2 pages.
Absorbtion.Dictionary.com, Random House, Inc., Accessed Jul. 15, 2010, 2 pages.
Oskam, et al, *Sol-Gel Synthesis of Carbon/Silica Gel Electrodes for Lithium Intercalation*, Electrochemical and Solid-State Letters, vol. 2, No. 12, Dec. 12, 1999, pp. 610-612, XP 001101158.
Ng, et al, *Si-O network encapsulated graphite-silicon mixtures as negative electrodes for lithium-ion batteries*, Journal of Power Sources, vol. 94, No. 1, Feb. 15, 2001, pp. 63-67, XP 001164263.
Aurbach, et al, *Behavior of lithiated graphite electrodes comprising silica based binder*, Journal of Applied Electrochemistry, vol. 28, No. 10, Oct. 10, 1998, pp. 1051-1059, XP 000786929.
Chen, et al, *Improving the Performance of Soft Carbon for Lithium-Ion Batteries*, Electrochimica acta, vol. 51, No. 19, May 20, 2006, pp. 3890-3894, XP 5427738A.
U.S. Notice of Allowance dated May 26, 2011, for cross reference U.S. Appl. No. 11/641,947 (now U.S. Patent 8,026,004), (11 pages).
U.S. Office action dated Jun. 3, 2010, for cross reference U.S. Appl. No. 11/258,150 (now abandoned), (15 pages).
U.S. Office action dated Sep. 8, 2010, for cross reference U.S. Appl. No. 11/590,980 (now U.S. Patent 8,119,283), (8 pages).
U.S. Office action dated Jun. 24, 2011, for cross reference U.S. Appl. No. 11/590,980 (now U.S. Patent 8,119,283), (11 pages).
U.S. Notice of Allowance dated Oct. 17, 2011, for cross reference U.S. Appl. No. 11/590,980 (now U.S. Patent 8,119,283), (8 pages).
U.S. Notice of Allowance dated Jan. 6, 2011, for cross reference U.S. Appl. No. 11/590,980 (now U.S. Patent 8,119,283), (6 pages).
U.S. Office action dated Aug. 8, 2011, for cross reference U.S. Appl. No. 12/208,672, (15 pages).
U.S. Office action dated Nov. 10, 2011, for cross reference U.S. Appl. No. 12/208,672, (20 pages).
Liu, et al., *A soft chemistry synthesis and electrochemical properties of $LiV_3O_8$ as cathode material for lithium secondary batteries*, Solid State Ionics, (2005), vol. 176, pp. 1549-1554, XP-002475780.
Japanese Office action dated Mar. 8, 2011, for Japanese Patent application 2007-303257, (3 pages).
Japanese Office action dated Jul. 3, 2012, for corresponding Japanese Patent application 2007-151715, (4 pages).
Patent Abstracts of Japan, and English machine translation of Japanese Publication 10-340723 listed above (22 pages).
Patent Abstracts of Japan, and English machine translation of Japanese Publication 11-354104 listed above (18 pages).
Patent Abstracts of Japan, and English machine translation of Japanese Publication 2001-015101 listed above (11 pages).
Patent Abstracts of Japan, and English machine translation of Japanese Publication 2001-216962 listed above (11 pages).
U.S. Office action dated Mar. 6, 2013, for cross reference U.S. Appl. No. 11/937,462, (9 pages).
SIPO Reexamination dated Nov. 29, 2012, with English translation of p. 1 only, for Chinese Patent application 200810149608.5, (19 pages).
SIPO Reexamination dated Apr. 3, 2013, with English translation, for Chinese Patent application 200710300121.8, (27 pages).
English translation of SIPO Office action dated Aug. 28, 2009, for Chinese Patent application 200710152425.4, previously submitted in an IDS dated Nov. 12, 2009 (10 pages).
SIPO Reexam Office action dated Sep. 26, 2012, for Chinese Patent application 200810149608.5, with English translation, (13 pages).
U.S. Office action dated Oct. 26, 2012, for cross reference U.S. Appl. No. 11/937,462, (20 pages).

* cited by examiner

NEGATIVE ACTIVE MATERIAL FOR LITHIUM SECONDARY BATTERY, AND LITHIUM SECONDARY BATTERY INCLUDING SAME

CROSS-REFERENCE TO RELATED APPLICATION

This application claims priority to and the benefit of Japanese Patent Application No. 2007-151715 filed in the Japanese Patent Office on Jun. 7, 2007, the entire content of which is incorporated herein by reference.

BACKGROUND OF THE INVENTION

1. Field of the Invention

The present invention relates to negative electrode materials for rechargeable lithium batteries, and to rechargeable lithium batteries including the same.

2. Description of the Related Art

A conventional rechargeable lithium battery includes a $LiCoO_2$ positive active material, a graphite negative active material, and a non-aqueous electrolyte. Rechargeable lithium batteries have been widely used as power sources for electronic devices such as cellular phones, digital still cameras, digital video cameras, and laptop computers. For the negative active material of a rechargeable lithium battery, carbon-based materials such as artificial or natural graphite, hard carbon, and so on, have been used.

Of the carbon-based materials, graphite has a low discharge potential of 0.2V compared with lithium, thereby increasing the discharge voltage and energy density of the battery. Therefore, a battery including graphite as the negative active material has a high average discharge potential of 3.6 to 3.7V and an excellent energy density. Furthermore, graphite is most comprehensively used of the aforementioned carbon-based materials since it guarantees better cycle-life for a battery due to its outstanding reversibility.

However, graphite has low density (i.e., a theoretical density of 2.2 g/cc). Thus, a negative electrode including graphite as the negative active material has low energy density per unit volume, consequently resulting in low capacity when used in a battery.

To address these problems, much research on oxide negative electrodes with high energy densities has been conducted. For example, a $Li_aMg_bVO_c$ (0.05≤a≤3, 0.12≤b≤2, 2≤2c−a−2b≤5) negative active material has been proposed.

A negative active material for a rechargeable lithium battery that includes a lithium vanadium composite oxide has also been proposed. The lithium vanadium composite oxide has a significantly lower discharge potential relative to lithium, thereby providing a rechargeable lithium battery having a high energy density. However, the lithium vanadium composite oxide undergoes an irreversible crystalline structure deterioration during charge and discharge, which causes decomposition of the electrolyte. As a result, the lithium vanadium composite oxide deteriorates the cycle-life of the battery.

SUMMARY OF THE INVENTION

An exemplary embodiment of the present invention provides a negative electrode material for a rechargeable lithium battery. Another exemplary embodiment of the present invention provides a rechargeable lithium battery including the negative electrode material. Yet another embodiment of the present invention provides a negative electrode material for a rechargeable lithium battery capable of improving cycle-life characteristics of a rechargeable lithium battery by suppressing the volume change the occurs during charge and discharge due to the expansion and contraction of the crystal structure of a lithium vanadium composite oxide.

Still another embodiment of the present invention provides a rechargeable lithium battery including the negative electrode material. The rechargeable lithium battery has improved capacity and cycle-life characteristics.

According to one embodiment of the present invention, a negative electrode material for a rechargeable lithium battery includes an oxide represented by Formula 1. The oxide is capable of intercalating and deintercalating lithium ions, and has a full width at half maximum (FWHM) of the X-ray diffraction angle (2θ) at a (003) plane of 0.2 degrees or more as measured by X-ray diffraction analysis using a CuKα ray.

$$Li_xM_yV_zO_{2+d}$$ Formula 1

In Formula 1, 0.1≤x≤2.5, 0≤y≤0.5, 0.5≤z≤1.5, 0≤d≤0.5, and M is selected from Al, Cr, Mo, Ti, W, Zr, Mg, and combinations thereof.

The oxide may have a FWHM of the X-ray diffraction angle (2θ) at a (003) plane of 0.25 degrees or more as measured by X-ray diffraction analysis using a CuKα ray.

The oxide may be subjected to mechanical milling treatment.

The negative electrode material for a rechargeable lithium battery may further include a material selected from carbon, transition elements, transition element alloys, and mixtures thereof.

In one embodiment, the negative active material may include a material selected from carbon, transition elements, transition element alloys, and mixtures thereof, and an oxide of Formula 1 disposed on the surface of the material.

The transition element alloy may be an A-B alloy where A is a transition element, and B is selected from transition elements, alkali metals, alkaline earth metals, aluminum, gallium, indium, carbon, silicon, germanium, tin, antimony, selenium, tellurium, and combinations thereof, provided that when B is a transition element, it is an element different than A.

The oxide may have an average particle diameter of about 3 μm or less.

In another embodiment of the present invention, a rechargeable lithium battery includes the above negative electrode material.

A conventional lithium vanadium composite oxide ($Li_xM_yV_zO_{2+d}$) has a regular crystalline structure. According to one embodiment of the present invention, the crystalline structure is disarranged by a mechanical milling treatment. The treated material was measured with an X-ray diffraction device, and the results show an increased FWHM compared to the FWHM prior to the treatment. The mechanical milling treatment conditions determine how the FWHM is increased. In particular, the increase in the FWHM is determined by the duration of the treatment or the physical intensity toward the lithium vanadium composite oxide material.

Hereinafter, the reaction mechanism of the negative electrode (including the mechanical-milling-treated lithium vanadium composite oxide) upon charging and discharging will be described.

In a conventional lithium vanadium composite oxide ($Li_xM_yV_zO_{2+d}$), when lithium ions are inserted into the crystalline structure of the $Li_xM_yV_zO_{2+d}$, the spaces between layers widens because the lithium ions are inserted between layers of the crystalline structure of the $Li_xM_yV_zO_{2+d}$. When the lithium ions are deintercalated between the layers, the space between the layers narrows but does not return to the pre-charge and discharge state. As the charge and discharge cycles are repeated, the space between the layers widens further. As a result, the conductivity of the lithium ions between the layers of the $Li_xM_yV_zO_{2+d}$ deteriorates, thereby decreasing the capacity of the charge and discharge.

In contrast, according to embodiments of the present invention, as the crystal structure of the $Li_xM_yV_zO_{2+d}$ is preliminary disarranged, and as the inside thereof absorbs the stress incurred when the lithium ions are inserted between the layers of the $Li_xM_yV_zO_{2+d}$, it is possible to microscopically suppress the expansion of the crystal structure of the $Li_xM_yV_zO_{2+d}$. In other words, according to embodiments of the present invention, it is possible to suppress the volume change that occurs in conventional lithium vanadium composite oxides during charge and discharge due to expansion and contraction of the crystal structure. Because the degree of volume change increases as charge and discharge are repeated, the ability of the inventive materials to suppress the volume change represents a remarkable improvement over the conventional art. The inventive materials can also improve the cycle-life characteristics. When the negative electrode includes the material according to embodiments of the present invention, it is possible to provide a rechargeable lithium battery having high capacity and a cycle-life longer than that of a conventional battery.

DETAILED DESCRIPTION OF THE EMBODIMENTS

Figure 3:
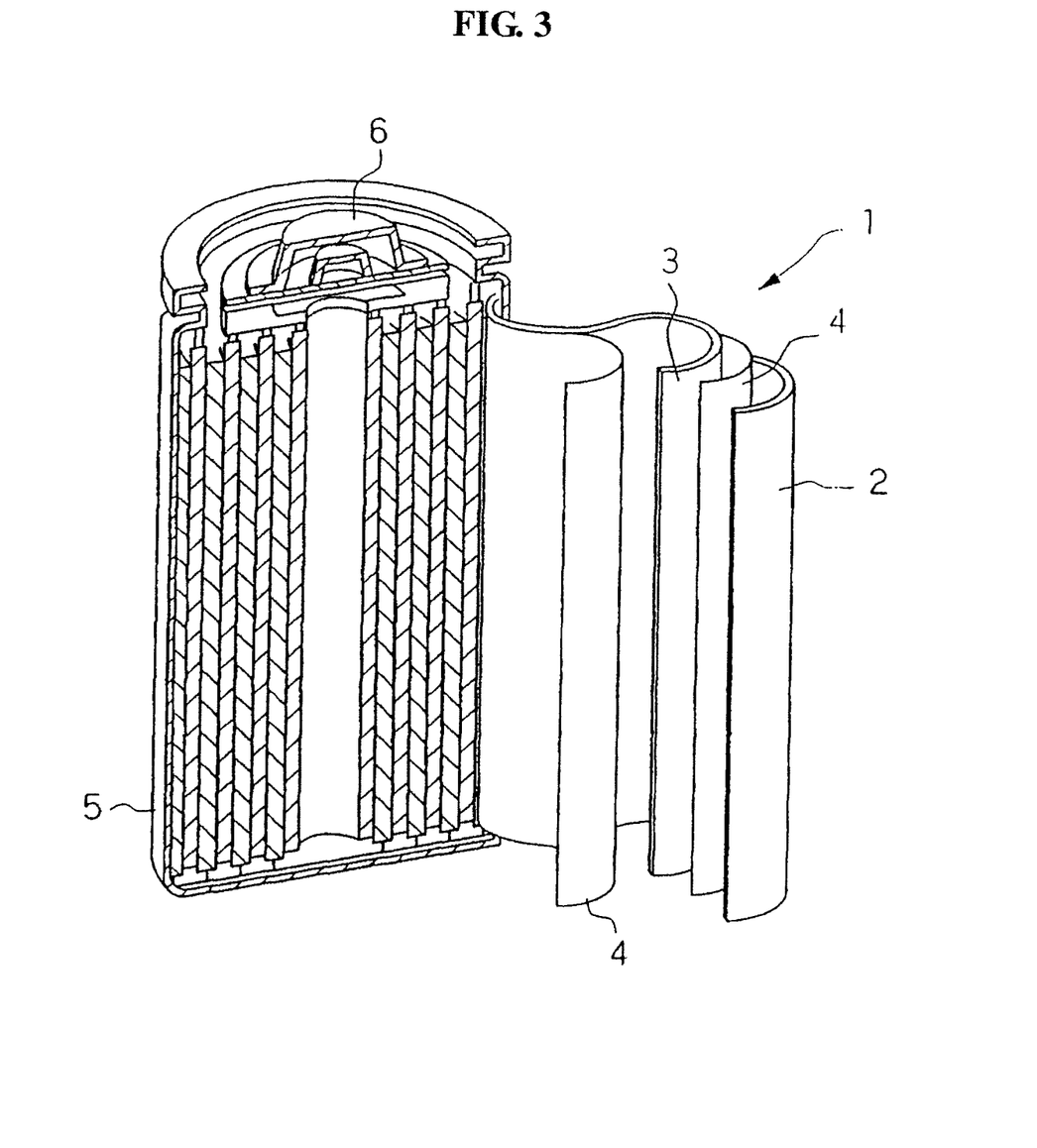
FIG. 3 is a schematic cross-sectional view of a rechargeable lithium battery according to one embodiment of the present invention.

According to one embodiment of the present invention, as shown in FIG. 3, a rechargeable lithium battery 1 includes a positive electrode 2, a negative electrode 3, and a non-aqueous electrolyte.

The negative electrode includes an oxide represented by Formula 1, and the oxide has a FWHM of the X-ray diffraction angle (2θ) at a (003) plane of 0.2 degrees or more as measured by X-ray diffraction analysis using a CuKα ray. The measurement may be carried out at a scan speed of 1 degree/minute, a measurement range of 5 to 90 degrees, a column voltage of 50 KV, and a column current of 300 mA.

Formula 1

In Formula 1, 0.1≤x≤2.5, 0≤y≤0.5, 0.5≤z≤1.5, 0≤d≤0.5, and M is selected from Al, Cr, Mo, Ti, W, Zr, Mg, and combinations thereof.

As the rechargeable lithium battery includes the negative electrode, it is possible to increase the capacity and improve the cycle-life characteristics of the battery.

According to one embodiment of the present invention, as shown in FIG. 3, a rechargeable lithium battery 1 includes an electrode assembly including a positive electrode 2, a negative electrode 3, and a separator 4. The electrode assembly is contained in a battery case 5 and sealed with a cap assembly 6. Hereinafter, the positive electrode, negative electrode, and non-aqueous electrolyte in the rechargeable lithium battery are described.

Negative Electrode

In one embodiment, the negative electrode includes a negative active mass including a negative active material, a binder, a conductive agent as needed, and a negative current collector on which the negative active mass is disposed. The negative active material is an oxide represented by Formula 1 that is mechanically milled to provide an oxide with a FWHM of the X-ray diffraction angle (2θ) at a (003) plane of 0.2 degrees or more as measured by X-ray diffraction analysis using a CuKα ray. According to one embodiment, the FWHM of the X-ray diffraction angle (2θ) at a (003) plane is 0.25 degrees or more. In another embodiment, the FWHM of the X-ray diffraction angle (2θ) at a (003) plane is 0.4 degrees or more.

Formula 1

In Formula 1, 0.1≤x≤2.5, 0≤y≤0.5, 0.5≤z≤1.5, 0≤d≤0.5, and M is selected from Al, Cr, Mo, Ti, W, Zr, Mg, and combinations thereof.

The negative active mass may be formed in a disk-shape to fabricate a pellet-shaped or sheet-shaped electrode.

The negative active material according to one embodiment may include a first negative active material including the oxide of Formula 1 and a second negative active material selected from carbon, transition elements, transition element alloys, and combinations thereof. When the negative active material includes the second negative active material, the first negative active material may be mixed with the second negative active material, or may be disposed on the surface of the second negative active material.

The second negative active material may include any material capable of electrochemically reversibly intercalating and deintercalating lithium ions. According to one embodiment, the second negative active material is not dissolved in or reacted with the electrolyte during charge and discharge of the battery.

The transition element alloy may be an A-B alloy where A is a transition element and B is selected from transition elements, alkali metals, alkaline earth metals, aluminum, gallium, indium, carbon, silicon, germanium, tin, antimony, selenium, tellurium, and combinations thereof, provided that when B is a transition element, it is different than A.

The oxide represented by Formula 1 has a R-3M layered structure where Li and oxygen are alternated with transition elements (M) and oxygen. In other words, some of the transition elements (V) are substituted with Li to enrich Li, and further substituted with other transition elements (i.e., M=Al, Cr, Mo, Ti, W, Zr, or Mg) to enable reversible intercalation and deintercalation of lithium ions.

Before mechanical milling, the oxide represented by Formula 1 has a FWHM of the X-ray diffraction angle (2θ) at a (003) plane of 0.1 to 0.18 degrees as measured by X-ray diffraction analysis. The conditions of the X-ray diffraction analysis a target of Cu, scan speed of 1 degree/minute, measurement range of 5 to 90 degrees, column voltage of 50 KV, and current of 300 mA. When changing the mechanical milling conditions, the resultant material has a FWHM of the X-ray diffraction angle (2θ) at a (003) plane of 0.2 degrees or more.

If the peak at the (003) plane is lost or too broad when the X-ray peak profile is broken, the FWHM is nearly indefinite so that it is difficult to determine the FWHM. According to embodiments of the present invention, cycle-life characteristics are improved when the FWHM is about 0.20 or greater.

According to another embodiment, the FWHM is about 0.25 or greater. In a further another embodiment, the FWHM is 0.4 or greater.

Mechanical milling applies physical energy to the raw material of the oxide represented by Formula 1. Nonlimiting examples of suitable mechanical milling techniques include planetary ball milling, electric motor ball milling, ball milling, oscillation ball milling, high-speed mixing, and so on. The conditions for controlling the mechanical milling to misalign the crystal structure of the crystalline material may include variations in the centrifugal force (gravitational acceleration, G) applied to the raw material, the hardness of the medium (such as a ball), and the high specific gravity for improving gravitational acceleration. The gravitational acceleration may be about 5 G or greater. According to another embodiment, the gravitational acceleration is about 10 G or greater. The higher the gravitational acceleration the better as long as it is possible to cool the container including the raw material to prevent a temperature increase since the physical energy of the gravitational acceleration is transformed into heat and the crystal might be heated by the temperature increase. Similarly, the longer the treatment duration the better, as long as temperature increases are prevented. As the treatment lengthens, the crystal becomes amorphous, but it is necessary to prevent temperature increases.

Furthermore, the raw material of the oxide represented by Formula 1 is pulverized by the mechanical milling treatment. According to one embodiment, the average particle diameter is about 3 μm or less. In another embodiment, the average particle diameter is about 1 μm or less. The finer the particles the better, and therefore there is no lower limit to the average particle diameter.

When the mechanical milling treatment is performed, the second negative active material or metal of the conductive agent (described further below) may be used together with the oxide represented by Formula 1. According to another embodiment, the oxide represented by Formula 1 (after mechanical milling) is composited on the surface of the second negative active material or metal of the conductive agent (making up a core of the negative active material). In this case, the core material may include any material having high conductivity and compatibility with the oxide represented by Formula 1. Accordingly, it is possible to improve the conductivity at the interface with the oxide represented by Formula 1.

During mechanical milling the container in which the raw material is contained may have an inert atmosphere. This prevents oxidation of the transition elements or the transition element alloys mixed with the oxide represented by Formula 1. The inert atmosphere may include any gas that does not react with the raw material oxide represented by Formula 1 or the transition elements or transition element alloys. In particular, the gas may include an inert gas such as helium or argon, nitrogen gas, and so on.

The binder for the negative electrode may be any organic or inorganic material that can be dispersed or dissolved in a solvent along with the negative active material and that can bind the negative active material during removal of the solvent. In one embodiment, the binder does not dissolve in the electrolyte solution or decompose by electrochemical reaction during charge and discharge of the battery.

The binder can also bind the negative active material by mixing and then press-forming the negative active material. The binder may be selected from vinyl-based resins, cellulose-based resins, phenol resins, thermoplastic resins, thermosetting resins, and so on. Nonlimiting examples of suitable binders include polyvinylidene fluoride, polyvinyl alcohol, carboxymethyl cellulose, styrene butadiene rubber, and so on.

The negative electrode may further include a conductive agent such as carbon black, graphite powders, carbon fibers, metal powders, metal fibers, and so on. The negative electrode current collector may be formed of a material that does not dissolve in the electrolyte solution during charge and discharge and has high conductivity. Such a negative current collector may include a metal foil or a metal net formed of copper.

According to one embodiment of the present invention, a method of manufacturing the negative electrode includes mixing the mechanical-milling-treated active material ($Li_xM_yV_zO_{2+d}$), a binder, and, optionally, a conductive agent to provide a mixture, introducing the mixture into an organic solvent capable of dissolving the binder to provide a slurry, coating the slurry on a current collector such as a copper foil, heating the same to remove the organic solvent and to laminate the negative active mass on the current collector.

Positive Electrode

According to embodiments of the present invention, the positive electrode of the rechargeable lithium battery includes a positive active mass including a positive active material capable of intercalating and deintercalating lithium ions, a conductive agent, and a binder. The positive electrode further includes a positive current collector on which the positive active mass is disposed. The positive active mass may be formed into a disk-shape to provide a pellet-shaped or sheet-shaped electrode.

The positive active material may be a Li-containing compound, oxide, sulfide, and so on. The positive active material may include transition elements. At least one material selected from Mn, Co, Ni, Fe, Al, and combinations thereof may be used. Nonlimiting examples of suitable positive active materials include $LiMn_2O_4$, $LiCoO_2$, $LiNiO_2$, $LiFeO_2$, $LiNi_{1/3}CO_{1/3}Mn_{1/3}O_2$, $LiNi_{0.8}CO_{0.2}O_2$, $LiNi_{0.8}CO_{0.15}Al_{0.05}O_2$, and so on.

The binder may include polyvinylidene fluoride, polytetrafluoroethylene, rubber-based materials such as styrene butadiene rubber (SBR), or ethylene propylene diene monomer (EPDM). The conductive agent may include carbon, such as carbon black, ketjen black, graphite, and so on. The positive current collector may include a metal foil or a metal net formed of aluminum, stainless steel, and so on.

Non-Aqueous Electrolyte

The non-aqueous electrolyte includes a lithium salt dissolved in an aprotic solvent. The aprotic solvent may include a cyclic carbonate, linear carbonate, or combinations thereof.

Nonlimiting examples of suitable combinations of cyclic and linear carbonates include ethylene carbonate/dimethyl carbonate, ethylene carbonate/methylethylcarbonate, ethylene carbonate/diethylcarbonate, propylene carbonate/dimethyl carbonate, propylene carbonate/methylethylcarbonate, propylene carbonate/diethylcarbonate, ethylene carbonate/propylene carbonate/dimethyl carbonate, ethylene carbonate/propylene carbonate/methylethylcarbonate, ethylene carbonate/propylene carbonate/diethylcarbonate, ethylene carbonate/dimethyl carbonate/methylethylcarbonate, ethylene carbonate/dimethyl carbonate/diethylcarbonate, ethylene carbonate/methylethylcarbonate/diethylcarbonate, ethylene carbonate/dimethylcarbonate/methylethylcarbonate/diethylcarbonate, ethylene carbonate/propylene carbonate/dimethyl carbonate/methylethylcarbonate, ethylene carbonate/propylene carbonate/dimethyl carbonate/diethylcarbonate, ethylene carbonate/propylene carbonate/methylethylcarbonate/diethylcarbonate, ethylene carbonate/propylene carbonate/dimethyl carbonate/methylethylcarbonate/diethylcarbonate.

The cyclic carbonate and linear carbonate may be mixed in a weight ratio ranging from about 1:99 to about 99:1. In another embodiment, they are mixed in a weight ratio ranging from about 5:95 to about 70:30. In still another embodiment, they may be mixed in a weight ratio ranging from about 10:90 to about 60:40. When they are mixed in a weight ratio within the above ranges, the non-aqueous electrolyte does not deteriorate the charge and discharge characteristics of the rechargeable lithium battery and has good electrical conductivity.

The lithium salt may include $LiPF_6$, $LiBF_4$, $LiClO_4$, $LiAsF_6$, $Li_2SiF_6$, $LiOSO_2C_kF_{(2k+1)}$ (where k is an integral from 1 to 8), $LiPF_n\{C_kF_{(2k+1)}\}_{(6-n)}$ (where n is an integer ranging from 1 to 5, and k is an integer ranging from 1 to 8), and the like. In addition, the lithium salt may include a lithium salt represented by one of the following formulae: $LiC(SO_2R_5)(SO_2R_6)(SO_2R_7)$, $LiN(SO_2OR_8)(SO_2OR_9)$, $LiN(SO_2R_{10})(SO_2OR_{11})$, $LiN(SO_2R_{12})(SO_2R_{13})$. $R^5$ to $R^{13}$ can be the same or different, and can be a perfluoro alkyl group with from 1 to 8 carbons. A single lithium salt can be used or a mixture of two or more lithium salts may be used.

The non-aqueous electrolyte may be a polymer electrolyte prepared by mixing at least one lithium salt with a polymer such as polyethylene oxide, polyvinyl alcohol, and the like, or impregnating the aprotic solvent and lithium salt into a polymer with a high-swelling property.

Separator

A separator is essential when the non-aqueous electrolyte is not a polymer electrolyte. The separator may be any conventional separator such as a porous polypropylene film or a porous polyethylene film, and may be either mono-layered or multi-layered.

The rechargeable lithium battery according to embodiments of the present invention is not limited to including only the positive electrode, negative electrode, and non-aqueous electrolyte. The battery may further include other elements as required.

As described above, the negative electrode material can prevent deterioration due to the expansion and contraction of the negative active material caused by repeating charging and discharging. In addition, the negative active material can improve the cycle-life characteristics of the rechargeable lithium battery using the negative electrode material.

The following Examples are presented for illustrative purposes only, and do not limit the scope of the present invention.

Example 1

$V_2O_4$ and $Li_2CO_3$, and $MgCO_3$ were dry-mixed at a mole ratio of Li:V:Mg of 1.1:0.89:0.01 to provide a mixture. The mixture was fired under a nitrogen atmosphere in an electric furnace at 1100° C. to provide $Li_{1.1}Mg_{0.01}V_{0.89}O_2$. The material had an average particle diameter of 15 μm.

After mixing the material with a synthetic graphite having an average particle diameter of 20 μm in a weight ratio of 9:1, the resulting mixture was introduced into a stainless steel container of a planetary ball mill (P-5 type, manufactured by Fritsch) together with a 1.5 cm stainless steel ball. The container was closed and sealed under an argon atmosphere and treated at 10 G for 0.5 hour.

Figure 1:
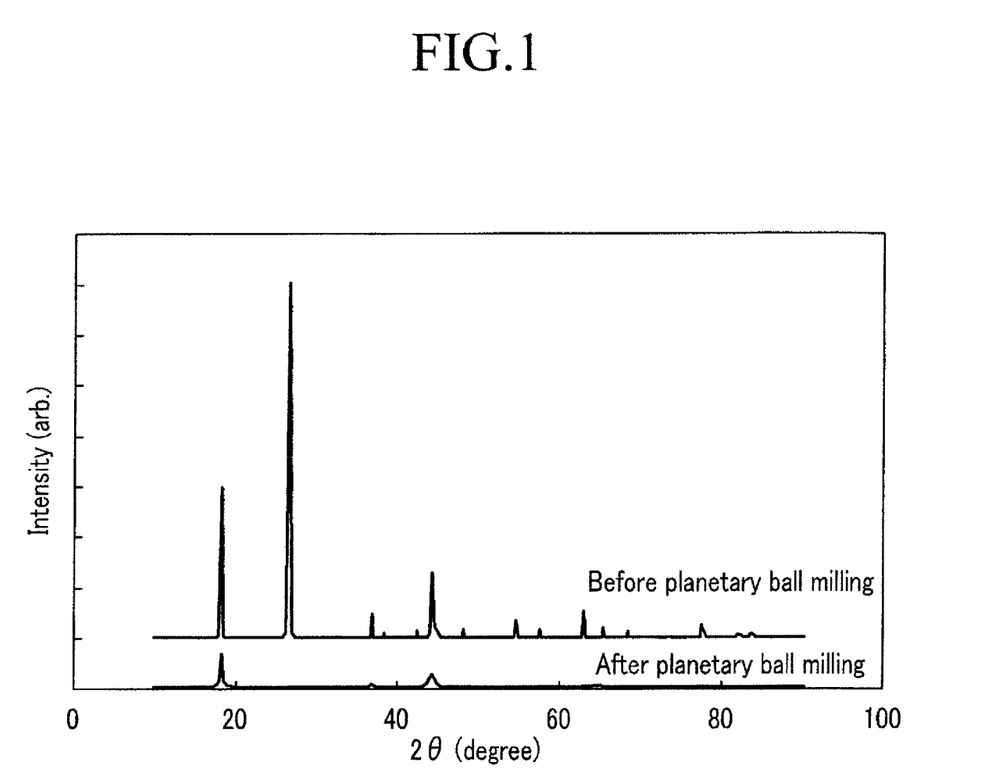
FIG. 1 is a graph comparing X-ray diffraction profiles of the lithium vanadium composite oxide prepared according to Example 1 before and after planetary ball milling.

The material was measured with an X-ray diffraction device (RINT2000 manufactured by Rigaku Corporation) at measurement conditions of 50 kV, 300 mA, 1 degree/minute, and 5 to 90 degrees. The results are shown in FIG. 1.

The FWHM of the (003) plane peak (2θ:18 degrees adjacent) after the planetary ball milling was 0.28 degrees, and the FWHM of the (003) plane peak before the treatment was 0.18 degrees.

Scanning electron microscopy (SEM) and energy dispersive X-ray (EDX) spectroscopy confirmed that there were lithium vanadium composite oxide particles having a particle diameter of 0.1 to 1 μm on the surface of the graphite particles.

45 parts by weight of the material was dry-mixed with 45 parts by weight of a synthetic graphite conductive agent and 10 parts by weight of polyvinylidene fluoride (manufactured by Kureha Chemical Industry Co., Ltd. #1100). Then N-methyl-2-pyrrolidone was added thereto and the resulting material was kneaded to provide a paste. The paste was coated on a 20 μm thick copper foil by a coater, and then dried and pressed to a thickness to provide a negative electrode.

A positive electrode was prepared by dry-mixing 92 parts by weight of $LiCoO_2$, 3 parts by weight of a carbon conductive agent, and 5 parts by weight of polyvinylidene fluoride (manufactured by Kureha Chemical Industry Co., Ltd. #1100). Then N-methyl-2-pyrrolidone was added thereto and the resulting material was kneaded to provide a paste. The paste was coated on a 20 μm thick aluminum foil by a coater, and then dried and pressed to a thickness to provide a positive electrode.

The positive and negative electrodes were laminated together with a 25 μm thick polypropylene separator laminated between the positive and negative electrodes to provide an electrode assembly. The resulting electrode assembly was injected with a non-aqueous electrolyte to provide a 2032 type coin-type rechargeable lithium cell.

$LiPF_6$ was dissolved in a 1.00 mol/L mixed solvent including ethylene carbonate and diethylcarbonate in a weight ratio of 3:7 to provide the non-aqueous electrolyte solution.

The resultant cell was measured to determine discharge capacity by charging with a constant current and constant voltage (0.1 C, 4.5V) at 25° C., discontinuing for 1 hour, and discharging until the voltage reached 2.5V with a constant current (0.1 C). The charging and discharging were repeated until the discharge capacity reached 60% or less of the initial capacity, and the number of charge and discharge cycles when it reached 60% of the initial battery capacity was recorded as the battery cycle-life. Furthermore, the cell was discharged at 1 C, and the 1 C capacity was compared to the capacity at 0.1 C discharge.

Example 2

A coin cell was fabricated as in Example 1, except that the gravitational acceleration of the planetary ball mill varied from 1 to 30 G, the treatment duration varied from 15 minutes to 20 hours, and the cell was measured to determine the relationship between FWHM and battery cycle-life.

The FWHM of the material fabricated under the varying treatment conditions were measured by X-ray diffraction, and the relationships thereof are shown in Table 1.

TABLE 1

| Treatment condition | | |
| --- | --- | --- |
| Gravitational acceleration (G) | Treatment hours (h) | FWHM |
| 1 | 0.25 | 0.18 |
| 5 | 5 | 0.25 |
| 15 | 1 | 0.28 |
| 30 | 2 | 0.5 |
| 15 | 5 | 0.74 |
| 10 | 20 | 1.1 |

Example 3

A coin cell was fabricated as in Example 1, except that nickel having an average particle diameter of 10 μm was used as the conductive agent instead of the synthetic graphite, and battery cycle-life was measured.

Furthermore, after planetary ball milling, the FWHM of the (003) plane peak (2θ:18 degrees adjacent) was 0.35 degrees.

Example 4

A coin cell was fabricated as in Example 1, except that a nickel aluminum:alloy (50:50 mole ratio) having an average particle diameter of 10 μm was used to mix with $Li_{1.1}Mg_{0.01}V_{0.89}O_2$ instead of the synthetic graphite, and battery cycle-life was measured.

After planetary ball milling, the FWHM of the (003) plane peak (2θ:18 degrees adjacent) was 0.31 degrees.

Example 5

A coin cell was fabricated as in Example 1, except that an oscillation mill was used instead of the planetary ball mill, and battery cycle-life was measured.

The oscillation milling treatment was carried out under with a 20 mm stainless steel ball for 10 hours. 20° C. cooling water was flowed through the container jacket to maintain a constant temperature as the treatment progressed. After oscillation milling, the (003) plane peak (2θ:18 degrees adjacent) was distorted, and the FWHM thereof could not be calculated.

Comparative Example 1

A coin cell was fabricated and measured as in Example 1, except that $Li_{1.1}Mg_{0.01}V_{0.89}O_2$ was obtained only by firing without planetary ball milling.

Comparative Example 2

A coin cell was fabricated and measured as in Example 3, except that planetary milling was not performed.

Comparative Example 3

A coin cell was fabricated and measured as in Example 4, except that planetary ball milling was not performed.

Comparative Example 4

A coin cell was fabricated and measured as in Example 5, except that oscillation milling was not performed.

Table 2 shows the integrated data of the 1 C/0.1 C characteristics and the cycle-life characteristics of each Example with respect to the corresponding Comparative Example. For the 1 C/0.1 C characteristics and cycle-life characteristics, the values are calculated based on a value of the Comparative Examples of 1.0.

TABLE 2

|  | 1C/0.1C | cycle-life |
|---|---|---|
| Example 1/Comparative Example 1 | 1.15 | 1.32 |
| Example 3/Comparative Example 2 | 1.21 | 1.36 |
| Example 4/Comparative Example 3 | 1.19 | 1.33 |
| Example 5/Comparative Example 4 | 1.17 | 1.6 |

As clearly shown in Table 2, the Examples according to the present invention improved the 1 C/0.1 C high rate discharge characteristics by 15 to 21% and the battery cycle-life characteristics by 32 to 60% with respect to those of the Comparative Examples.

It is estimated that the negative electrode material according to the present invention improved the high-rate discharge characteristics by improving the conductivity, increasing the diffusion speed of the lithium ions, and/or reducing the effective current density. The improved conductivity is achieved by compositing the $Li_{1.1}Mg_{0.01}V_{0.89}O_2$ (having lower conductivity than metal or graphite) on the surface of the synthetic graphite, nickel, or nickel aluminum alloy. The diffusion speed of the lithium ions is increased by pulverizing the $Li_{1.1}Mg_{0.01}V_{0.89}O_2$. The reduced effective current density is achieved by increasing the specific surface area.

With respect to cycle-life, as the crystal structure was misaligned by subjecting the crystalline $Li_{1.1}Mg_{0.01}V_{0.89}O_2$ to mechanical milling (such as planetary ball milling or oscillation ball milling), the structure was transformed into an amorphous structure. As a result, the volume changes due to expansion and contraction of the $Li_{1.1}Mg_{0.01}V_{0.89}O_2$ during intercalation and deintercalation of lithium ions during charge and discharge are prevented.

Figure 2:
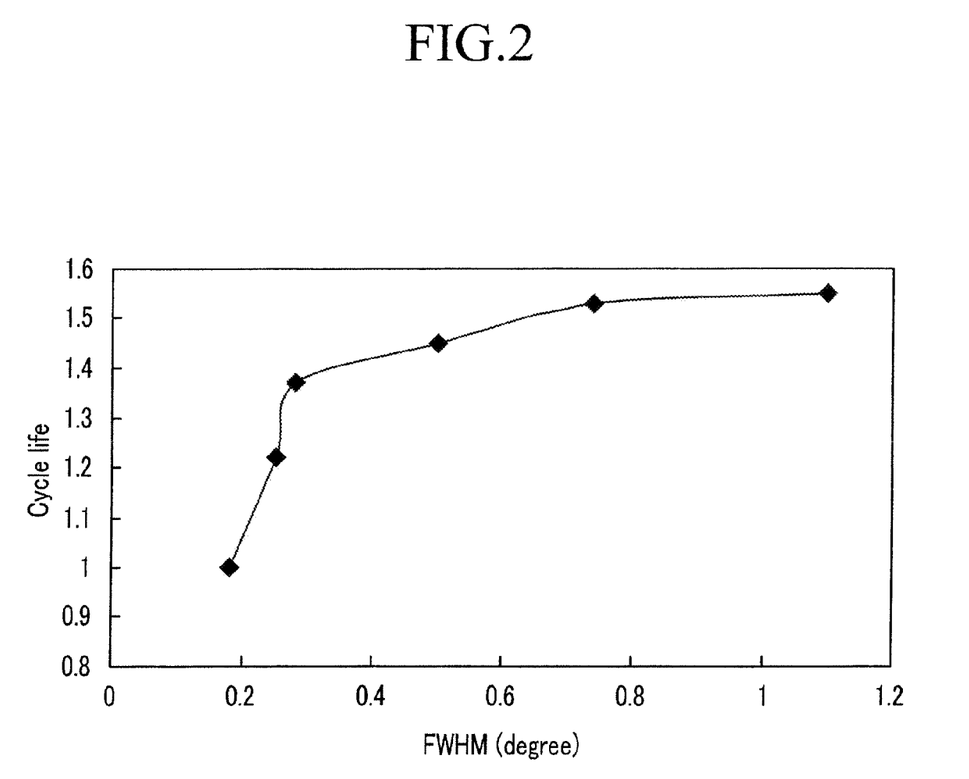
FIG. 2 is a graph of the relationship between the FWHM of the X-ray diffraction angle (2θ) at a (003) plane to the cycle-life of the rechargeable battery prepared according to Example 2.

The result of X-ray diffraction analysis for the $Li_{1.1}Mg_{0.01}V_{0.89}O_2$ obtained by changing the gravitational acceleration and treatment duration shows that the FWHM of the oxide is between 0.18 and 1.1. The relationship of battery cycle-life and the FWHM are shown in FIG. 2.

The battery cycle-life characteristics were remarkably improved as the FWHM of $Li_{1.1}Mg_{0.01}V_{0.89}O_2$ increased. In particular, when the FWHM is greater than 0.25, the cycle-life characteristics improved by from about 22 to 55%.

As a result of preliminarily misaligning the crystalline structure of the $Li_{1.1}Mg_{0.01}V_{0.89}O_2$, it is possible to absorb the stress incurred when lithium ions are introduced between layers of the $Li_{1.1}Mg_{0.01}V_{0.89}O_2$. Thereby, expansion of the crystalline structure of the $Li_{1.1}Mg_{0.01}V_{0.89}O_2$ was suppressed compared to the Comparative Examples.

In other words, the volume change due to electrode expansion and contraction during charge and discharge can be suppressed. The volume change increased more as charge and discharge were repeated, yielding a more remarkable improvement over the Comparative Examples. As a result, the inventive materials have improved cycle-life characteristics.

As described above, embodiments of the present invention provide a rechargeable lithium battery having high energy density, longer cycle-life, and excellent high-rate discharge characteristics by using a negative electrode material according to embodiments of the present invention as the negative electrode.

While this invention has been illustrated and described in connection with certain exemplary embodiments, it is understood by those of ordinary skill in the art that various changes and modifications to the described embodiments may be made without departing from the spirit and scope of the present invention as defined in the following claims.

What is claimed is:

1. A negative active material for a rechargeable lithium battery comprising:
   a mechanically milled oxide capable of intercalating and deintercalating lithium ions, the oxide being represented by Formula 1 and having a full width at half maximum of an X-ray diffraction angle (2θ) at a (003) plane of 0.2 degrees or greater as measured by X-ray diffraction analysis using a CuK α ray:

$$Li_xM_yV_zO_{2+d}$$ Formula 1 wherein $0.1 \le x \le 2.5$, $0 \le y \le 0.5$, $0.5 \le z \le 1.5$, $0 \le d \le 0.5$, and M is selected from the group consisting of Al, Cr, Mo, Ti, W, Zr, Mg, and combinations thereof, and wherein the oxide has an average particle diameter of less than 1 μm.

2. The negative active material of claim 1, wherein the mechanically milled oxide has a full width at half maximum of an X-ray diffraction angle (2θ) at a (003) plane of 0.25 degrees or greater as measured by X-ray diffraction analysis using a CuK α ray.

3. The negative active material of claim 1, wherein the negative active material further comprises an additional material selected from the group consisting of carbon, transition elements, transition element alloys, and mixtures thereof.

4. The negative active material of claim 3, wherein the mechanically milled oxide represented by Formula 1 is coated on a surface of the additional material.

5. The negative active material of claim 3, wherein the additional material comprises a transition element alloy comprising an A-B alloy, wherein A is a transition element, and B is selected from the group consisting of transition elements, alkali metals, alkaline earth metals, aluminum, gallium, indium, carbon, silicon, germanium, tin, antimony, selenium, tellurium, and combinations thereof, wherein when B is a transition element, B and A are not the same transition element.

6. A rechargeable lithium battery comprising:
a positive electrode;
a non-aqueous electrolyte; and
a negative active material comprising:
a mechanically milled oxide capable of intercalating and deintercalating lithium ions, the oxide being represented by Formula 1 and having a full width at half maximum of an X-ray diffraction angle (2θ) at a (003) plane of 0.2 degrees or greater as measured by X-ray diffraction analysis using a CuK α ray:

$$Li_xM_yV_zO_{2+d} \qquad \text{Formula 1}$$

wherein $0.1 \leq x \leq 2.5$, $0 \leq y \leq 0.5$, $0.5 \leq z \leq 1.5$, $0 \leq d \leq 0.5$, and M is selected from the group consisting of Al, Cr, Mo, Ti, W, Zr, Mg, and combinations thereof, and wherein the oxide has an average particle diameter of less than 1 μm.

7. The rechargeable lithium battery of claim 6, wherein the mechanically milled oxide has a full width at half maximum of an X-ray diffraction angle (2θ) at a (003) plane of 0.25 degrees or greater as measured by X-ray diffraction analysis using a CuK α ray.

8. The rechargeable lithium battery of claim 6, wherein the negative active material further comprises an additional material selected from the group consisting of carbon, transition elements, transition element alloys, and mixtures thereof.

9. The rechargeable lithium battery of claim 8, wherein the mechanically milled oxide represented by Formula 1 is coated on a surface of the additional material.

10. The rechargeable lithium battery of claim 9, wherein the additional material comprises a transition element alloy comprising an A-B alloy, wherein A is a transition element, and B is selected from the group consisting of transition elements, alkali metals, alkaline earth metals, aluminum, gallium, indium, carbon, silicon, germanium, tin, antimony, selenium, tellurium, and combinations thereof, wherein when B is a transition element, B and A are not the same transition element.

* * * * *